United States Patent [19]
Bose et al.

[11] 3,983,494
[45] Sept. 28, 1976

[54] FREQUENCY INSENSITIVE SINE WAVE-TO-COSINE WAVE CONVERTER

[75] Inventors: Bimal K. Bose, Troy; Paul M. Espelage, Ballston Lake, both of N.Y.

[73] Assignee: General Electric Company, Schenectady, N.Y.

[22] Filed: Mar. 24, 1975

[21] Appl. No.: 561,592

[52] U.S. Cl. ................................. 328/21; 328/26; 328/155; 307/229
[51] Int. Cl.² .................................. H03K 17/07
[58] Field of Search .............. 307/230, 21, 26, 229; 328/144, 160, 155

[56] References Cited
UNITED STATES PATENTS 3,639,847  2/1972  Remy et al. ........................... 328/160
3,675,137  7/1972  Raphael .............................. 328/144

Primary Examiner—Stanley D. Miller, Jr.
Assistant Examiner—B. P. Davis
Attorney, Agent, or Firm—Donald R. Campbell; Joseph T. Cohen; Jerome C. Squillaro

[57] ABSTRACT

Variable frequency sine waves are converted to constant amplitude cosine waves using the relationship $\cos \omega t = \sqrt{1-\sin^2\omega t}$. The converter has an almost instantaneous response characteristic and is suitable for a wide frequency range. An application is cosine timing waves for phase controlled converters and cycloconverters.

7 Claims, 3 Drawing Figures

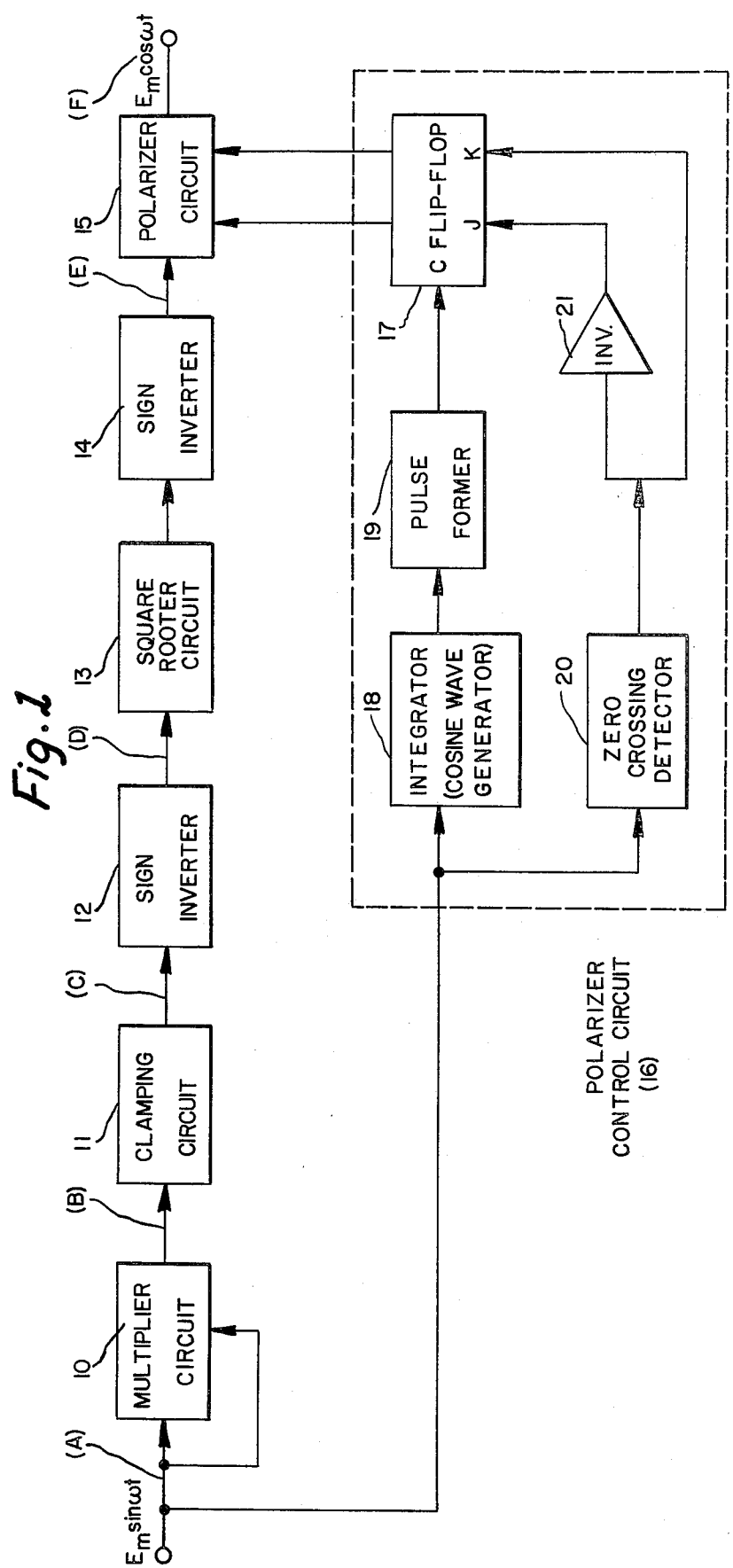

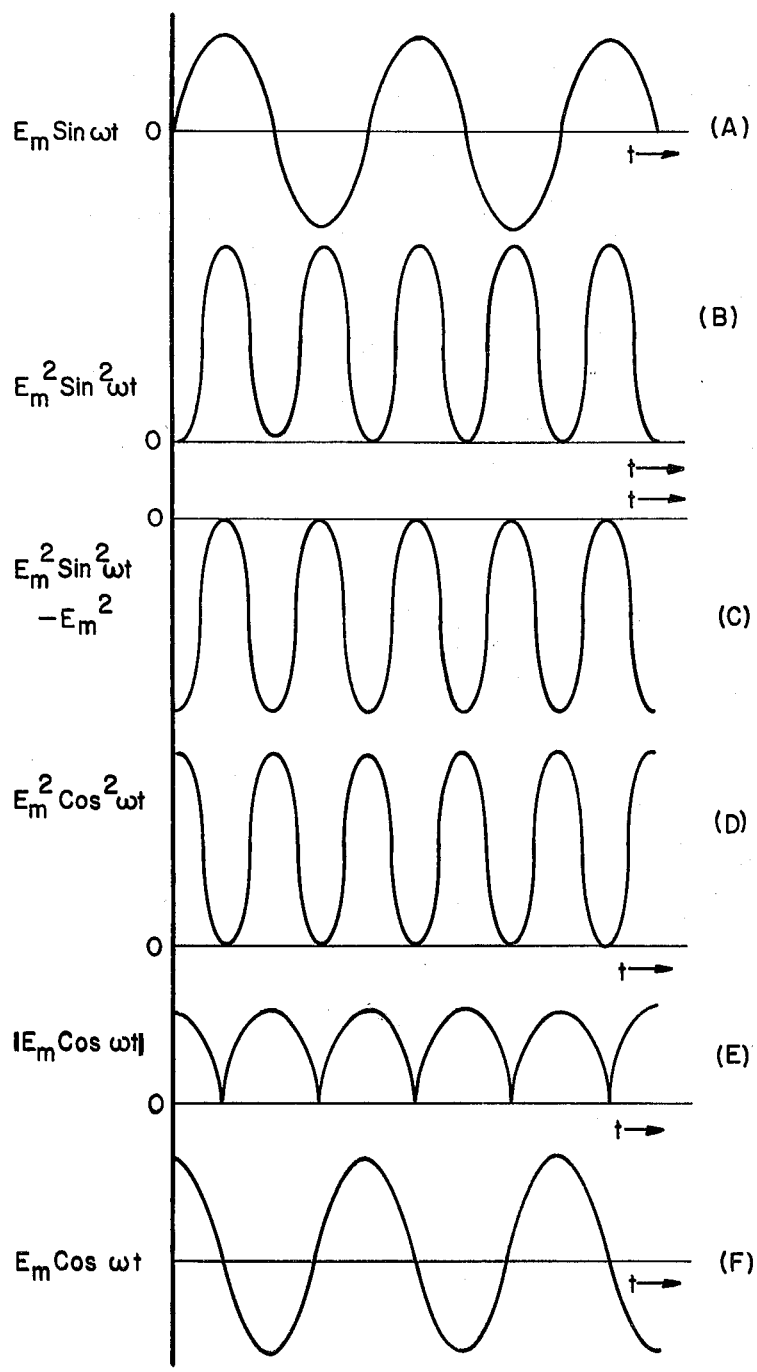

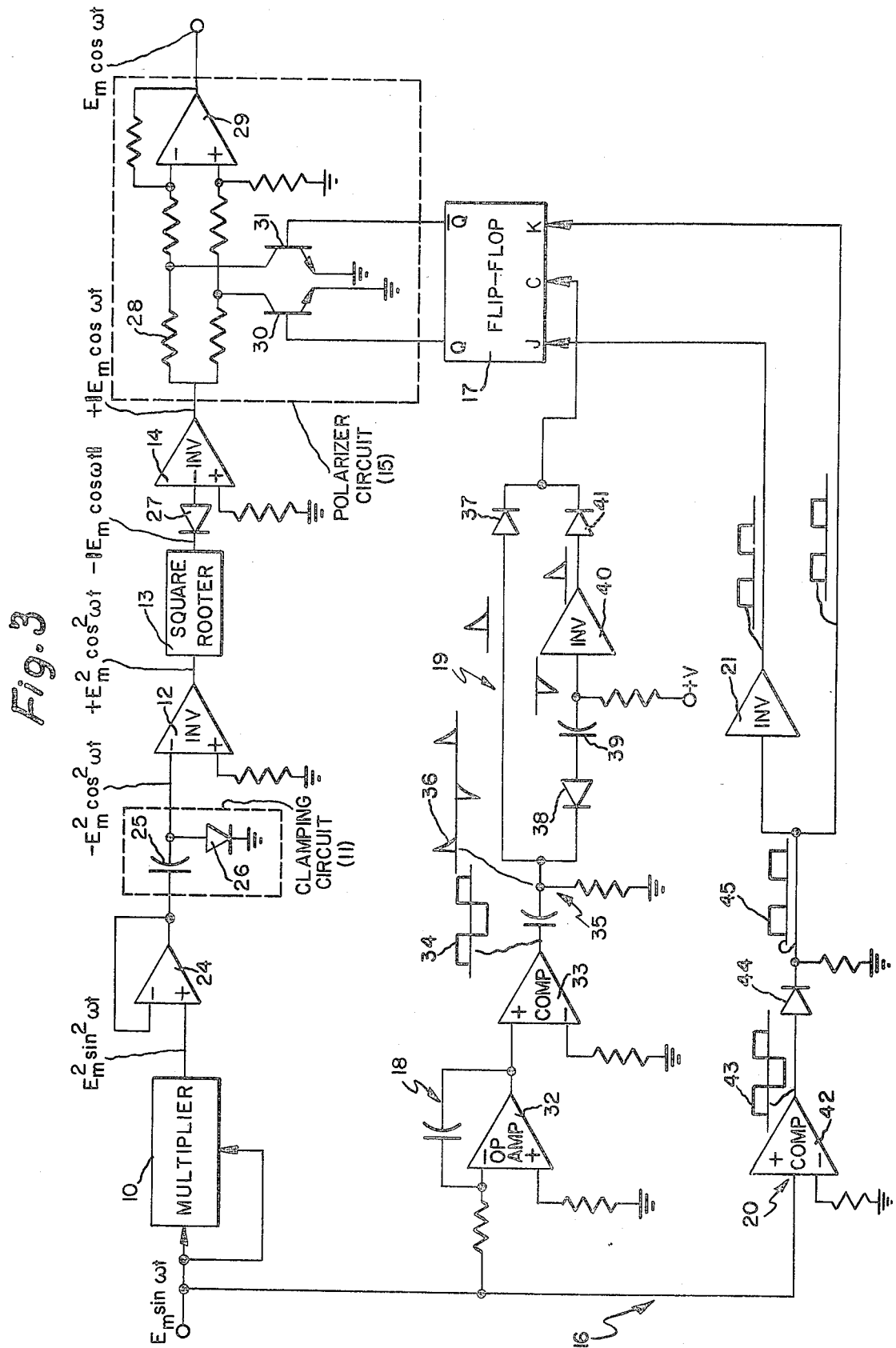

FREQUENCY INSENSITIVE SINE WAVE-TO-COSINE WAVE CONVERTER

BACKGROUND OF THE INVENTION

This invention relates to the generation of cosine waves from sine waves, and more particularly to a frequency insensitive sine wave-to-cosine wave converter having a substantially instantaneous response characteristic.

In a phase controlled converter or cycloconverter, a phase control technique that employs cosine timing waves is commonly used to linearize the transfer function between the input control signal and the ideal output voltage. In a three phase system in which the supply voltages are balanced in amplitude and phase, a frequency insensitive cosine timing wave can easily be generated by addition and subtraction of phasors. In a single phase system, the cosine wave is normally generated by integrating a sine wave, however a difficulty arises when the sine waves have a variable frequency since the amplitude of the cosine waves is then inversely proportional to frequency. While the prior art teaches the multiplying of the amplitude of the cosine wave by a voltage proportional to the frequency, the frequency-to-voltage converter introduces harmonics that are normally eliminated by a filter. This scheme is satisfactory in steady state operation but if the frequency drifts in a transient manner the asymmetrical time lags in the integrator and frequency-to-voltage converter causes transient drift in the cosine wave amplitude. The result of using a variable amplitude cosine timing wave in the control of a converter system is that the firing angle of the SCR's or other devices drifts and this in turn causes drift of the output voltage. When the phase controlled converter operating frequency changes to a high value, the control circuit depending upon operation as a rectifier or inverter will lock up in the advance limit and retard limit modes respectively, and a cycloconverter will generate flat topped waves thereby introducing excessive harmonics into the load and source. Frequency insensitive cosine timing waves eliminate these problems and maintain a truly linear transfer characteristic, and additionally the response of the converter is almost instantaneous for any transient frequency deviation.

Although suitable for many applications, the sine wave-to-cosine wave converter herein described has particular utility as a cosine timing wave generator used in the control of a cascaded high frequency link cycloconverter or cycloinverter system such as is disclosed in U.S. Pat. No. 3,742,336 to B. D. Bedford and in U.S. Pat. No. 3,882,369 to William McMurray, both assigned to the assignee of this invention. In this converter system, as typically used with an inductive load, variable commutation energy is provided by operating the parallel resonant circuit in the link above its resonant frequency. The successful operation of this system under steady state and transient conditions needs a cosine wave converter with an instantaneous response which generates cosine timing waves whose magnitude faithfully tracks the input signal magnitude regardless of frequency.

Summary of the Invention

In accordance with the invention, frequency insensitive sine wave-to-cosine wave conversion which is operative with a substantially instantaneous response characteristic over a wide frequency range is based on the trigonometric relationship $\cos \omega t = \sqrt{1-\sin^2\omega t}$.

Broadly stated, the sine wave-to-cosine wave converter is comprised by first circuit means for continuously multiplying the variable frequency sine wave input signal by itself to generate a first signal representative of the squared term $\sin^2\omega t$; second circuit means for effectively shifting the voltage level of the first signal to generate a second signal representative of the difference term $1-\sin^2\omega t$; and third circuit means for effectively taking the square root thereof to generate a cosine wave output signal with amplitude directly proportional to the input signal amplitude. It is preferably constructed with integrated circuits employing a clamping circuit to effect the level shifting of the $E_m^2\sin^2\omega t$ output of an analog multiplier circuit, and further using a sign inverter circuit to derive a signal representative of the term $E_m^2\cos^2\omega t$. In the embodiment here described constructed with state-of-the-art components, a square rooter circuit generates a full wave rectified cosine wave signal which is then converted to the ac cosine wave output signal by means of a polarizer circuit controlled to change state at intervals corresponding to the zero crossings of the cosine wave output singal. The frequency insensitive converter operates successfully at high frequencies in the kilohertz range as well as at low frequencies.

BRIEF DESCRIPTION OF THE DRAWINGS

FIG. 1 is a simplified block diagram of the frequency insensitive sine wave-to-cosine wave converter constructed according to the preferred embodiment of the invention;

FIG. 2 shows several voltage waveforms produced at various stages of the cosine wave conversion; and FIG. 3 is a more detailed schematic circuit diagram and block diagram similar to FIG. 1 of a cosine timing wave generator.

DESCRIPTION OF THE PREFERRED EMBODIMENT

The frequency insensitive sine wave-to-cosine wave converter employing the trigonometric relationship $\cos \omega t = \sqrt{1-\sin^2\omega t}$ is illustrated in schematic block diagram form in FIG. 1 in a form suitable for fabrication using presently available state-of-the-art integrated circuit devices. Within the broader scope of the invention, as will be further explained later, various other circuits implementing or otherwise utilizing this trigonometric relationship can be constructed. The variable frequency sine wave input signal $E_m\sin \omega t$ can vary over a wide frequency range, such as from low power frequencies to tens of kilohertz, and rapid changes in frequency can be accommodated since the converter is characterized by almost instantaneous response without amplitude drift.

Referring also to FIG. 2 which shows the waveforms obtained at several stages or points in FIG. 1 as indicated by the letters A–F, the input sine wave signal $E_m\sin \omega t$ at A is first squared in an analog multiplier circuit 10 to generate at its output B a signal representative of the square $E_m^2\sin^2\omega t$. Using a clamping circuit 11, the voltage level of the sine wave squared signal is then effectively level shifted by an amount equal to the square of the peak amplitude of the sine wave squared signal, thereby generating at the point C a level shifted waveform representative of the signal $E_m^2\sin^2\omega t - E_m^2$. From the foregoing trigonometric relationship, it is seen that the signal at C represents the term $-E_m^2\cos^2\omega t$. Thus, as the next stage in the sine wave to cosine wave conversion, a sign inverter circuit 12 is employed to instantaneously change the polarity of the input signal and generate at the output a cosine wave squared signal $E_m^2\cos^2\omega t$. The algebraic manipulation formed at this stage is $-[E_m^2(\sin^2\omega t - 1)] = E_m^2(1-\sin^2\omega t)$.

An analog square rooter circuit 13 is now used to take the square root and generate at its output a negative-going full wave rectified cosine wave signal $-|E_m\cos\omega t|$. A second sign inverter circuit 14 is now used to produce at its output E the polarity inverted signal $|E_m\cos\omega t|$. As the final step in the conversion, a polarizer circuit 15 converts the full wave rectified cosine wave to the true cosine wave ac output signal $E_m\cos\omega t$ generated at the output F.

As is observed by comparing the waveforms at the input and the output of the polarizer circuit 15, every alternate pulse of the output of the second inverter 14 is polarity reversed by the polarizer circuit to construct the true cosine wave. A polarizer control circuit 16, one form of which is illustrated in FIG. 1, desirably includes a drive flip-flop circuit 17 that causes the polarizer 15 to change between inverting and noninverting modes at each zero crossing of the cosine wave. The drive flip-flop 17 is preferably a J-K type flip-flop or bistable multivibrator having a clock input as well as J-K inputs as is known in the art. The actuating means for the flip-flop includes an integrator circuit 18 for converting the sine wave input signal to a control circuit cosine wave, and a pulse former circuit 19 for producing a train of pulses corresponding to the zero crossings of the control circuit cosine wave. This train of pulses is fed continuously to the clock input of the flip-flop 17. The integrator 18 which functions as a cosine wave generator in the polarizer control circuit can be a prior art type such as that shown in FIG. 3, since the cosine wave output of the integrator is accurate as to the zero crossing points even though the amplitude varies with frequency. The J and K inputs of the flip-flop are preconditioned so that the change in state of the output occurs instantaneously when the clock pulses are applied. To this end, the actuating means further includes a zero crossing detector 20 for converting the sine wave input signal to binary type signals that are respectively coupled directly to the K input and through a sign inverter circuit 21 to the J input. This is clarified in the description of FIG. 3.

FIG. 3 is a detailed circuit diagram of an exemplary preferred embodiment of a frequency insensitive sine wave-to-cosine wave converter for generating cosine timing waves or firing waves for use in the control circuit of a phase controlled converter or cycloconverter. Cosine timing waves with an amplitude proportional to input signal amplitude over a range of, for example, 60 Hz to 8 kHz are required for proper operation of the cascaded high frequency link cycloconverter system as illustrated in FIGS. 14 and 15 of the previously mentioned U.S. Pat No. 3,882,369. For further information on the use of cosine timing waves, the reader is referred to the book "The Theory and Design of Cycloconverters" by William McMurray, The MIT Press, Cambridge, Mass., copyright 1972, Library of Congress Card Catalog No. 70-178121. As shown the input and thus the output signal have constant amplitudes. The converter of FIG. 3 operates satisfactorily except for a slight distortion near the zero crossing of the output wave due to nonlinearity of diode drop in the clamping circuit. For this application this minor irregularity in the output cosine wave is of no consequence.

The variable frequency sine wave input signal is multiplied by itself in the integrated circuit analog multiplier 10, and the sine wave squared output is fed through a voltage follower circuit 24 in order to provide a low source impedance for the capacitor-diode clamping circuit 11. Voltage follower 24 is suitably an integrated circuit operational amplifier with the inverting input connected directly to the output as is known in the art. The biasing and power supplies for this integrated circuit device as well as others to be mentioned later are not illustrated, and examples of presently available integrated circuits will be listed later. The clamping circuit 11 is comprised by a capacitor 25 connected in series between voltage follower 24 and sign inverter circuit 12, and one or more paralleled diodes 26 that are effectively connected between the junction of the capacitor and sign inverter circuit and ground. This clamping circuit shifts the voltage level of the sine wave squared signal and clamps the most positive potential of the generated negative-going cosine wave squared signal to ground. The sign inverter circuit 12 is also suitably an integrated circuit operational amplifier connected so that the input signal is applied to the inverting input, thereby producing at the output the positive-going cosine wave squared signal. The square rooter circuit 13 can be an integrated circuit analog multiplier device used to take the square root, and with the specific integrated circuit to be given later generates a negative-going full wave rectified cosine wave that is fed through a diode 27 to the inverting input of an integrated circuit operational amplifier used as a sign inverter.

In the polarizer circuit 15, the positive-going full wave rectified cosine wave at the output of inverter 14 is fed in parallel through two pairs of input resistors 28 to an integrated circuit operational amplifier 29 used as an inverting and noninverting amplifier. The inverting or noninverting operation of the amplifier 29 is determined by a pair of grounded emitter npn transistors 30 and 31 respectively having their collectors connected to the junction of the two pairs of input resistors 28, and further having their bases respectively connected to the Q and $\overline{Q}$ outputs of the drive flip-flop 17. In operation, transistors 30 and 31 are rendered conductive alternately by the drive flip-flop and change state at intervals coinciding with the zero crossing points of the ac cosine wave output to thereby alternately ground the input signals applied in parallel to the inverting and noninverting amplifier inputs.

In the polarizer control circuit 16, the integrator 18 is more specifically a prior art type cosine wave generator comprised by an integrated circuit operational amplifier 32 having a capacitor connected between the inverting input and the output, the sine wave input signal being fed through a series resistor to the inverting input. To provide the pulse former 19, an integrated circuit operational amplifier 33 is connected as a comparator and is operative to convert the control circuit ac cosine wave to a corresponding rectangular waveform 34. A conventional capacitor-resistor differentiator 35 produces a train of pulses 36 corresponding to the leading and trailing edges of the rectangular waveform 34. The positive-going pulses are fed directly through a diode 37 to the clock input of drive flip-flop 17, while the negative-going pulses are ac coupled through a diode 38 and a capacitor 39 to a sign inverter circuit 40. The input of inverter 40 is held above ground by a resistor connected to a source of voltage +V, while at the output the polarity inverted pulse is fed through another diode 41 to the clock input. Thus, clock pulses are supplied to the drive flip-flop at 180° intervals corresponding to the zero-crossings of the generated cosine wave.

In the circuit for deriving J and K signals for the drive flip-flop 17, the zero crossing detector 20 for the sine wave input signals is preferably an integrated circuit operational amplifier 42 connected as a comparator which produces at its output the rectangular waveform 43. Waveforms 34 and 43 are, of course, displaced 90° from one another. The rectangular wave 43 is fed through a diode 44 to effectively remove the negative rectangular pulses while leaving only the positive rectangular pulses 45. The train of spaced positive rectangular pulses 45 is fed directly to the K input of flip-flop circuit 17, and also through the sign inverter 21 to the J input. Thus, as is illustrated, the J and K signals are applied alternately at intervals corresponding to the zero crossings of the sine wave input signal, with the result that the drive flip-flop 17 is preconditioned to change state almost instantaneously upon application of the train of clock pulses 36.

A circuit that operates successfully in the frequency range of 60 Hz to 8 kHz and shows almost instantaneous response without amplitude drift uses the following components. Multipliers 10 and 13 are the AD4-20A and AD532JH integrated circuits manufactured by Analog Devices, Inc. of Norwood, Mass.; operational amplifiers 24, 12, 14, 29, 32 and 42 are the $\mu$A741C integrated circuit manufactured by the Fairchild Camera and Instrument Corp. of Mountain View, Cal., comparator 33 is the LM111 integrated circuit manufactured by the National Semiconductor Corp. of Santa Clara, Cal., and inverters 40 and 21 are the MC677 integrated circuit and flip-flop 17 is the MC663 integrated circuit manufactured by Motorola Semiconductor Products, Inc., of Phoenix, Ariz.

By way of summary, the frequency insensitive sine wave-to-cosine wave converter based on the relationship $\cos \omega t = \sqrt{1-\sin^2\omega t}$ herein taught can alternately be described in broad terms as including means for continuously multiplying a variable frequency sine wave input signal by itself to generate a first signal representative of the square $\sin^2\omega t$, a second means that effectively shifts the voltage level of the first signal to generate a second signal representative of the difference $1-\sin^2\omega t$, and a third means for effectively taking the square root of the second signal to generate a cosine wave output signal with an amplitude directly proportional to the input signal amplitude.

While the invention has been particularly shown and described with reference to a preferred embodiment thereof, it will be understood by those skilled in the art that various changes in the form and details may be made therein without departing from the spirit and scope of the invention.

The invention claimed is:

1. A frequency insensitive sine wave-to-cosine wave converter based on the relationship $\cos \omega t = \sqrt{1-\sin^2\omega t}$ comprising first circuit means for continuously multiplying a variable frequency sine wave input signal by itself to generate a first signal representative of the square $\sin^2\omega t$, second circuit means for effectively level shifting said first signal to generate a second signal representative of the difference $1-\sin^2\omega t$, and third circuit means for effectively taken the square root of said second signal to generate a cosine wave output signal with an amplitude proportional to the input signal amplitude, said second circuit means being comprised by a clamping circuit and a sign inverter circuit, and said third circuit means being comprised by a square rooter circuit for generating a full wave rectified cosine wave, a polarizer circuit for converting said full wave rectified cosine wave to the alternating voltage cosine wave output signal, and a polarizer control circuit for generating control signals for said polarizer circuit at intervals corresponding to the zero crossings of said cosine wave output signal.

2. A frequency insensitive sine wave-to-cosine wave converter based on the relationship $\cos \omega t = 1-\sin^2\omega t$ comprising an analog multiplier circuit for continuously multiplying by itself a variable frequency sine wave input signal to generate a first signal representative of the sine wave squared, a clamping circuit for effectively level shifting said first signal by an amount equal to the square of the peak amplitude of said first signal to thereby generate a second signal, a sign inverter circuit for instantaneously changing the polarity of said second signal and generating a third signal representative of the cosine wave squared, an analog square rooter circuit for taking the square root of said third signal and generating a full wave rectified cosine wave signal, and a polarizer circuit for converting said full wave rectified cosine wave signal to an alternating voltage cosine wave output signal having an amplitude proportional to the input signal amplitude.

3. A sine wave-to-cosine wave converter according to claim 2 wherein said clamping circuit is comprised by a capacitor connected in series between said analog multiplier circuit and said sign inverter circuit, and a diode effectively connected between the junction of said capacitor and sign inverter circuit and ground.

4. A sine wave-to-cosine wave converter according to claim 3 further including a voltage follower circuit connected between said analog multiplier circuit and said capacitor to present a low source impedance to said clamping circuit.

5. A sine wave-to-cosine wave converter according to claim 3 wherein said polarizer circuit is comprised by an inverting and noninverting amplifier, and a polarizer control circuit including a flip-flop connected to effectively control said inverting and noninverting amplifier, said polarizer control circuit further including means for actuating said flip-flop to change state and therefore cause said amplifier to alternately produce inverting and non-inverting outputs at intervals corresponding to the zero crossings of said cosine wave output signal.

6. A sine wave-to-cosine wave converter according to claim 5 wherein said means for actuating said flip-flop to change state includes an integrator circuit for converting said sine wave input signal to a control circuit cosine wave, a pulse former circuit for producing a train of pulses corresponding to the zero crossings of said control circuit cosine wave that are coupled to a first input of said flip-flop, and a zero crossing detector circuit for converting said sine wave input signal to rectangular wave signals that are respectively coupled to a second input of said flip-flop an through an inverter circuit to a third input of said flip-flop.

7. A sine wave-to-cosine wave converter according to claim 6 further including a sign inverter circuit connected between said square rooter circuit and said polarizer circuit.

* * * * *